UNITED STATES PATENT OFFICE 1,994,112

ALLOY

Wilhelm Sanzenbacher, Zurich, Switzerland

No Drawing. Application July 5, 1934, Serial No 733,896. In Germany August 25, 1933

1 Claim. (Cl. 75—1)

The invention relates to an alloy of aluminium, silver and magnesium for electric light reflectors or screens wherein the said reflectors or screens are exposed to strong heat or illuminations, or are subjected to strong radiations, the said alloy being useful for example for the reflector screens described in my specification Serial No. 685,285 but not being limited thereto.

I have found that an alloy of the composition stated above and particularly an alloy of 60% aluminium, 25% silver and 15% magnesium not only remains resistant to corrosion but also retains its colour and its polish even when exposed to strong heating and to light radiation. The relative proportions stated above may vary but the proportion of aluminium should be twice that of the silver.

Other alloys have the disadvantage that in use they rapidly acquire a brown or black colour, that their polish and their capacity to reflect light and so forth suffer considerably.

The new alloy is particularly suitable for screening devices which are arranged close to the incandescent lamp within a headlight of an automobile.

What I claim is:

An alloy for electric light reflectors and screens comprising aluminium, silver and magnesium substantially in the proportion of 60% aluminium 25% of silver and 15% magnesium.

WILHELM SANZENBACHER.